United States Patent
Bratthall et al.

(10) Patent No.: US 7,944,393 B2
(45) Date of Patent: May 17, 2011

(54) METHOD FOR POSITIONING AND A POSITIONING SYSTEM

(75) Inventors: Lars Bratthall, Hvalstad (NO); Mogens Mathiesen, Oslo (NO); Stefan Svensson, Västerås (SE)

(73) Assignee: ABB Research Ltd., Zürich (CH)

( * ) Notice: Subject to any disclaimer, the term of this patent is extended or adjusted under 35 U.S.C. 154(b) by 694 days.

(21) Appl. No.: 10/583,984

(22) PCT Filed: Dec. 17, 2004

(86) PCT No.: PCT/SE2004/001931
§ 371 (c)(1), (2), (4) Date: Aug. 4, 2008

(87) PCT Pub. No.: WO2005/062069
PCT Pub. Date: Jul. 7, 2005

(65) Prior Publication Data
US 2008/0284649 A1 Nov. 20, 2008

(30) Foreign Application Priority Data
Dec. 22, 2003 (SE) ...................................... 0303533

(51) Int. Cl.
*G01S 19/42* (2010.01)
(52) U.S. Cl. ................................................. 342/357.25
(58) Field of Classification Search .............. 342/357.25
See application file for complete search history.

(56) References Cited

U.S. PATENT DOCUMENTS

| 4,920,488 A | 4/1990 | Filley |
| 5,214,757 A | 5/1993 | Mauney et al. |
| 6,169,761 B1 * | 1/2001 | Marcoccia et al. ........... 375/132 |
| 6,609,090 B1 | 8/2003 | Hickman et al. |
| 2003/0126622 A1 * | 7/2003 | Cohen et al. .................. 725/135 |
| 2004/0160342 A1 * | 8/2004 | Curley et al. .............. 340/995.1 |
| 2004/0176107 A1 * | 9/2004 | Chadha ...................... 455/456.5 |

FOREIGN PATENT DOCUMENTS

| GB | 2371884 A | 8/2002 |
| WO | WO 96/35196 A1 | 11/1996 |

* cited by examiner

*Primary Examiner* — Thomas H Tarcza
*Assistant Examiner* — Harry Liu
(74) *Attorney, Agent, or Firm* — Venable LLP; Eric J. Franklin

(57) ABSTRACT

A method for recording a position of at least one component in a location system of a control system of an industrial facility for an industrial process. A model of the facility is created, including position coordinates for major parts of the facility. The model is stored in a location system storage. A component is identified. A mobile information processing device is placed adjacent the component and position coordinates are detected for the mobile information processing device. Identification information of the component and position coordinates of the mobile information processing device are stored in the location system storage.

44 Claims, 7 Drawing Sheets

METHOD FOR POSITIONING AND A POSITIONING SYSTEM

CROSS-REFERENCE TO RELATED APPLICATIONS

This application claims priority to Swedish patent application 0303533-4 filed 22 Dec. 2003 and is the national phase under 35 U.S.C. §371 of PCT/SE2004/001931 filed 17 Dec. 2004.

TECHNICAL FIELD

A method for recording the position of at least one component in a location system of a control system of an industrial facility for an industrial process.

BACKGROUND ART

An industrial process is performed in a facility, for instance, a plant by a technical system comprising components such as industrial process equipment for operation, control, regulation and protection of the process. Industrial process equipment is for instance pieces of apparatus such as valves, motors, pumps, conveyors and tanks, instruments and meters, electrical energy conservation apparatuses, power devices, control apparatus, protective devices, industrial loads, such as arc furnaces and rolling mills, and other devices.

The industrial process also comprises an industrial system comprising systems for functionality, control and supervision. This is enabled as an automated system, embodied in a computerized system as a software implementation of the industrial system. Each system is used to define a certain kind of relation between the components. The functional system defines how a function can be divided into subfunctions, which also can be divided into subfunctions, and so on. Each subfunction in the lowest subfunction level is carried out by a component or an element of the component. The control system defines the execution of each subfunction and supervises the component performance. A common control system has intersections with predefined connections such as a hierarchical configuration or cells along a line. The control system is also a tool for the daily work for engineers and maintenance personnel. When planning and implementing a system, at a site, the control system is partly created and populated automatically in the system.

The control functions of the industrial process also comprise a location system. The location system comprises representations of geographical areas and representations of specific devices, which are here called objects. The location system also defines how the components of the process are located within each other. The location system is also used to sort components according to their actual location. Essentially each component of the automated system is represented in both the functional system and the location system.

The industrial process is performed in an existing geographical area in an industrial facility, such as, a plant. Such a facility often comprises different existing geographical areas, such as production areas. These areas are often limited. When planning a production area, drawings for the physical location of each object of the production area are made. These drawings may also be used to implement the location system.

GB 2371884 describes a concept of a location system. However, the location system must be created manually as well as the population of the location system with components. Previously, the method in which to populate the location system has involved looking at Computer Aided Design (CAD) drawings and other paper-based information in order to define the representation of the different components in the correct location. Often the location system has not been used at all due to the amount of work required to configure it.

However, exchanging equipment which was never documented on a drawing, an insufficient CAD layout, maintenance over time or unforeseen installation complexity can cause the implementation of the real physical productions areas to be different from the planned location system.

Populating and repopulating an accurate location system with components quickly and without errors prevents several severe technical challenges.

SUMMARY OF THE INVENTION

The aim of the invention is to remedy the above-mentioned challenges.

A method for recording the position of at least one component in a location system of a control system of an industrial facility for an industrial process comprises the following step:
  the step of creating a model of the facility, including position coordinates for major parts of the facility,
  the step of storing the model in a location system storage means,
  the step of identifying a component in a facility,
  the step of placing a mobile information processing device adjacent the component and detecting position coordinates for the mobile information processing device,
  the step of storing identification information of the component and position coordinates of the mobile information processing device in the location system storage means.

An advantage of the invention is the reliability of a faultless integration of new components in a location system. Another advantage is the simplicity of the operation.

In a first aspect of the invention a method is described for using the mobile information processing device to populate a location system in a computerized system and creating a graphical model of the facility comprising the components performing an industrial process, wherein the model has a representation such as a map, a drawing or a data display.

In another first aspect of the invention, a method is described that is used to create an architectonic model of a facility comprising the components performing an industrial process, a model such as a miniature model of the facility and the components.

In a preferred embodiment of the invention the following steps in the above described method is repeated for each component that is to be recorded in the location system: the step of identifying a component, the step of placing a mobile information processing device adjacent the component and detecting position coordinates for the mobile information processing device, and the step of storing identification information of the component and position coordinates of the mobile information processing device in the location system storage means.

This is an advantage because a change in a facility usually affects more components then one.

In another preferred embodiment of the invention, a positioning system, such as a global positioning system, is used to detect the position coordinates of each position in a geographical area of the model. It is an advantage to use an existing system because there will be less new equipment needed. There is also an advantage to use an external satellite based system because it is calibrated outside the facility and therefore gives position information of a known accuracy.

In another preferred embodiment of the invention, one or more nodes of a wireless local area network is used to detect the position coordinates of each position of the model of the geographical area. This is an advantage because the system already comprises wireless nodes in the facility that can be used in the location system. This is also an advantage because an individual setting of location coordinates can be chosen.

In another preferred embodiment of the invention, button means or other input means is used to store the identification information of the component and position coordinates of the mobile information processing device in the location system. Other input means is voice sensitive means; gesture sensitive means those are advantageous if for instance the operator has to perform another task with his hands. This is also an advantage when a fast input in a complex environment is needed.

In another preferred embodiment of the invention, a data display means is used to store the identification information of the component and position coordinates of the mobile information processing device in the location system. The data display means is for instance a screen or a touch screen.

In another preferred embodiment of the invention, wireless communication means is used to store the identification information of the component and position coordinates of the mobile information processing device in the location system. This is an advantage because of the simplicity of wireless communication. This is also an advantage because of the easy access to equipment in a complex environment when no cables are needed.

In another preferred embodiment of the invention, a positioning system, such as a global positioning system, is used to detect the position coordinates of the location of the mobile information processing device. This has the same advantages as afore mentioned for a positioning system.

In another preferred embodiment of the invention, wireless means is used to detect the position coordinates of the location of the mobile information processing device. This has the same advantages as afore mentioned for wireless means.

In another preferred embodiment of the invention, a component comprises individual identification means attached to the component, such as a tag, e.g. bar code, a radio frequency tag or a wireless technology link and the component is identified in the control system by the individual identification means on the component. This is an advantage if the operator has not got this information.

In another preferred embodiment of the invention, the control system comprises image recognition means of the component and the component is identified in the control system by the image recognition means. This is an easy way of recognise a component. This is also an advantage if the component lacks other identification means.

In another preferred embodiment of the invention, a means to create position coordinates for a component in the location system when implementing the component in the control system is comprised.

In another preferred embodiment of the invention, a component is identified in the location system by navigating through a corresponding control system.

In another preferred embodiment of the invention, the model of the facility is separated in sub-areas, and each component located in that sub-area also has a sub-area position coordinate in the location system. This is an advantage because an industrial process often comprises several separate processing systems. The facility has location areas, sub-areas, such as main objects in a location system, such as robot cells in a car factory, robot cell 1, robot cell 2, etc. All robots in a certain robot cell and with sub-objects to the robots are then gathered in the system, located to that certain sub-area, a specific robot cell.

In another preferred embodiment of the invention, a component is located in a physical implementation by the location coordinates of the component in the location system.

In another preferred embodiment of the invention, clicking on a component or a sub-area in the location system selects that component or sub-area.

In another preferred embodiment of the invention, the graphical representation of the location system is a data display picture such as a spread sheet, a drawing and/or a diagram.

In another preferred embodiment of the invention, a computer program comprising programming instructions that control a computer or a computer process to perform a method in an industrial system for recording the position of at least one component in a location system of a control system of an industrial facility for an industrial process.

Another preferred embodiment of the invention is a computer program recorded on one or several computer-readable media.

Another preferred embodiment of the invention is a graphical user interface for recording the position of at least one component in a location system of a control system of an industrial facility for an industrial process. The graphical user interface comprises:

display means to display said at least one component,
display means to display position coordinates for said component,
input means to register the position coordinates of said component.

Another preferred embodiment of the invention is a graphical user interface, wherein the graphical user interface comprises:

input means to register identification information of the component,
input means to register position coordinates of the mobile information.

Another preferred embodiment of the invention is a graphical user interface, wherein the graphical user interface comprises display means to identify a component.

Another preferred embodiment of the invention is a graphical user interface, wherein the graphical user interface comprises input means to register the position coordinates for the mobile information processing device.

Another preferred embodiment of the invention is a graphical user interface, wherein the graphical user interface comprises:

display means for creating a model of the facility, including position coordinates for major parts of the facility such as sub-areas,
input means to register position coordinates of the model.

Another preferred embodiment of the invention is a system for recording the position of at least one component in a location system of a control system of an industrial facility for an industrial process. The system comprises a mobile information processing device, such as a mobile hardware Personal Digital Assistant (PDA), a computer program, graphical user interface, a positioning system such as indoor or outdoor GPS, positioning by WLAN or other standards or protocols, or GSM, a location system and, a computer such as a tablet personal computer PC.

Another preferred embodiment of the invention is a device for recording the position of at least one component in a location system of a control system of an industrial facility for an industrial process, wherein the device comprises a processor 40, memory means 41, standard interface 44, and display input means.

Another preferred embodiment of the invention is a computerised industrial system including means to perform a method for recording the position of at least one component in a location system of a control system of an industrial facility for an industrial process.

Another preferred embodiment of the invention is a database containing information to be used in a method in an industrial system for recording the position of at least one component in a location system of a control system of an industrial facility for an industrial process.

Another preferred embodiment of the invention is a comprising means to perform a method in an industrial system for recording the position of at least one component in a location system of a control system of an industrial facility for an industrial process.

Another preferred embodiment of the invention is a data communication signal for recording the position of at least one component in a location system of a control system of an industrial facility for an industrial process, wherein in the data signal comprising position information for a position of a mobile information processing device.

Another preferred embodiment of the invention is a data communication signal for recording the position of at least one component in a location system of a control system of an industrial facility for an industrial process, wherein in the data signal comprising identification information of the component.

BRIEF DESCRIPTION OF THE DRAWINGS

The present invention will be described in more detail in connection with the enclosed schematic drawings.

DESCRIPTION OF THE PREFERRED EMBODIMENTS

An industrial process comprises a technical system as a physical implementation, with physical components such as motors, valves etc, for operation, control, regulation and protection of the process. The technical system with its components is represented in a functional system.

Figure 1:
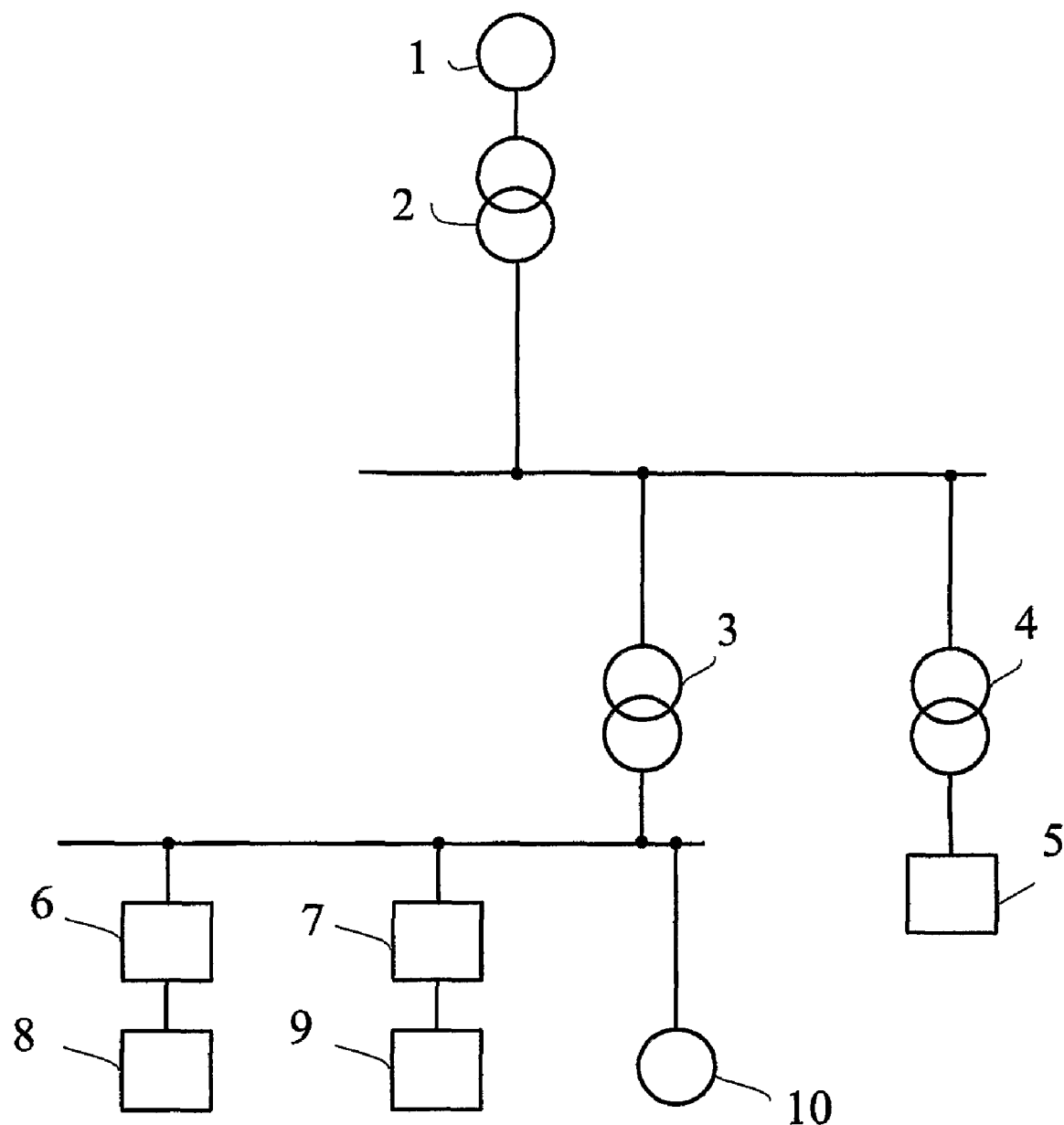
FIG. 1 shows schematically a simplified layout of the functional system of a technical system, comprising electrical equipment, according to the prior art.

FIG. 1 shows a simplified layout of the functional system of a technical system comprising components, namely a generator 1, transformers 2, 3, 4, valves 6, 7, a motor 10, and loads 5, 8, 9. The functional system has essentially a hierarchical configuration. When the functional system is created, a corresponding computer representation for each of the physical component in the process is also implemented in a computerized system.

To supervise and control the process as well as the individual components the process also has a control system. The control system comprises means to create a computer representation for each of the components in the process, created as software. The computer representations are included and organized in the control system. The functional system and the control system share data. For instance, when a motor is added to the functional system, means will automatically be generated to add the motor to the control system.

Figure 2:
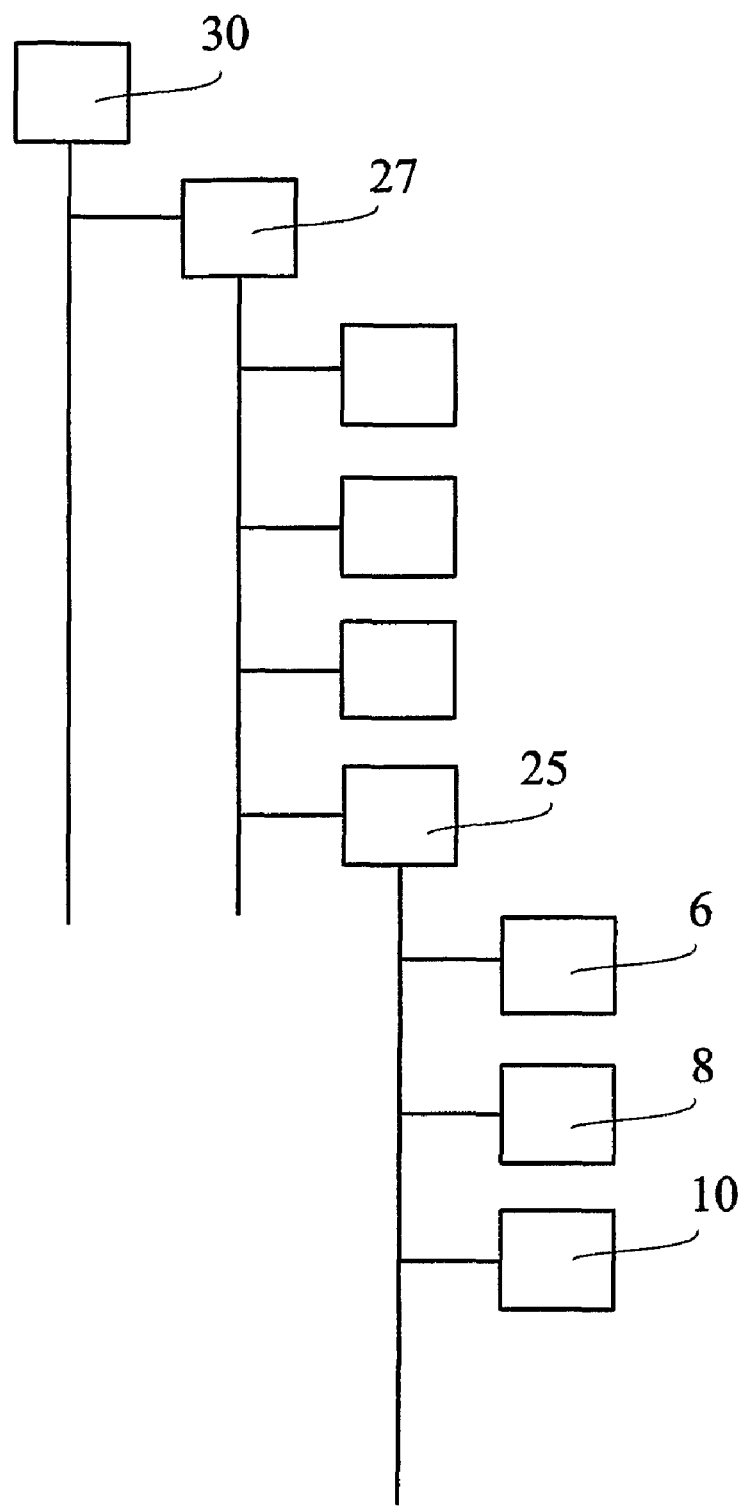
FIG. 2 shows schematically a simplified layout of the location system of a technical system, comprising electrical equipment, according to the prior art.

In the industrial process technical system each component has an individual real geographical position, for instance a component on an industry floor. To give a geographical overview of a facility comprising components of a process, the process also comprises a location system. FIG. 2 shows schematically a simplified layout of the location system, according to the prior art, of a process comprising a technical system comprising components such as electrical equipment. The real facility in the industrial process technical system can for instance be represented as a three-dimensional system of position coordinates corresponding to the real geographical positions in a computer representation of the facility. Inside the system of coordinates there can be smaller system of coordinates in order to get a higher resolution. The computer version is a duplicate of the real facility. The facility with its components is then present in two versions the real the facility with its components and the model, the computer representation of the facility with its components. In FIG. 2 a location system comprises components such as a valve 6, a load 8, or a motor 10 in a facility 30, in a location area such as a building 27, comprising other location areas. Physically the components are located on an industry floor. In the industrial process location system, each component has an individual relation as for the location of the component. Each component has a relation to that specific facility, in that specific building 27 and the specific location area 25 in the location system.

Figure 3A:
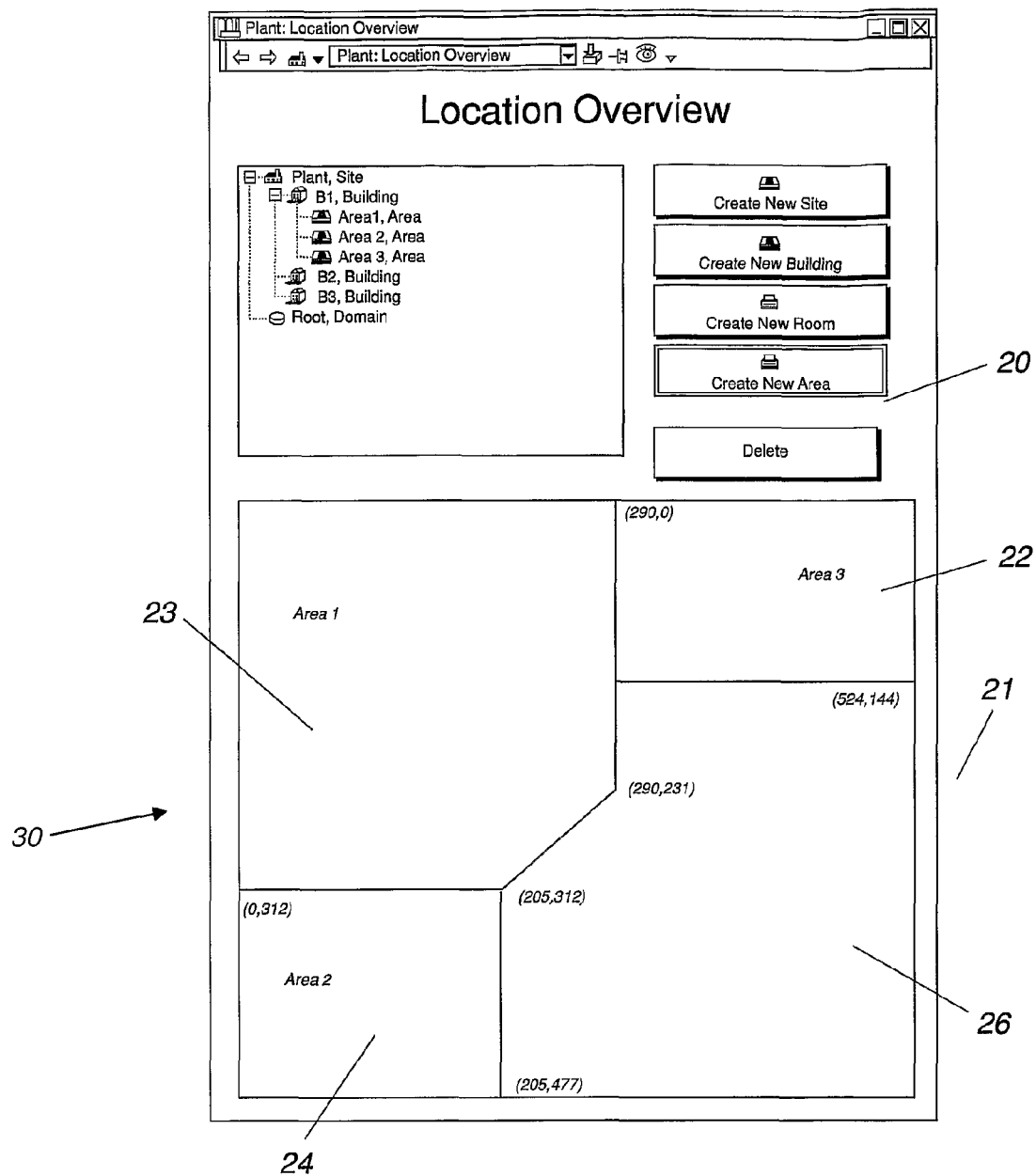
FIG. 3A shows a simplified layout of a location system corresponding to the technical system in an embodiment according to the invention.
Figure 3B:
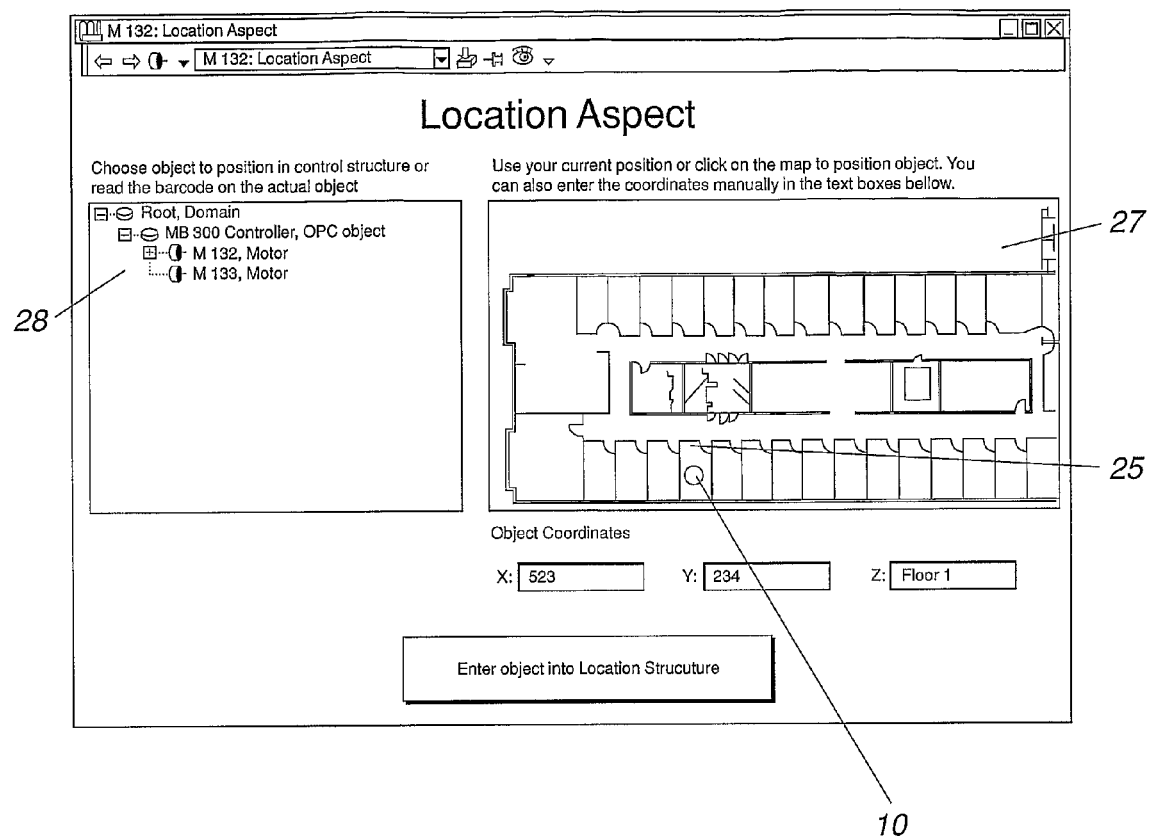
FIG. 3B shows a simplified layout of a corresponding location system to a technical system, comprising a geographical area representation with representations of components, in an embodiment according to the invention.

The location system comprises means for a graphical computer representation of the physical implementation of the process. In the location system, graphical computer representations are created corresponding to location areas and area borders of the physical implementation of the process. The model of the facility may be separated in sub-areas, and each component located in that sub-area also has a sub-area position coordinate in the location system. The industrial process comprises several separate processing systems. The facility has sub-areas such as location areas, and main objects in a location system. FIG. 3A shows a simplified layout of a location system corresponding to the technical system comprising a graphical area representation, as a data display 20 comprising a map. The map comprises a graphical computer representation for a building 21 in a facility 30, a plant. The building comprises graphical computer representations of the location areas 22, 23, 24, 26. The building and the location areas are sub-areas of the facility. Graphical computer representations are also created for each specific position of each component. FIG. 3B shows a part of the location system 28 represented as a simplified layout of a technical system as a graphical computer representation of a building 27, the graphical computer representation of a building comprising a graphical computer representation of a location area 25 comprising a graphical computer representation of a component, a motor 10. A location area is, for instance, an industry floor, a robot cell etc. A component is, for instance, a motor, a valve etc. Another function of the location system is to find a specific object, such as a component.

When the control system is implemented, corresponding means for presentation of the components are also generated in the location system, in that a computer representation of the components that are a part of the system is available to create a location system. To populate the location system, the components must also be placed in the correct location in the location system by defining coordinates for the location.

A method for populating the location system comprises the following steps:

Different areas of the production facility are set up, such as location areas and area borders, for instance, by dividing a map in areas with input of the geographical coordinates on the map. The geographical coordinates then correspond to the location coordinates such as the position coordinates and the sub-area coordinate in the location system.

For each component in the location system representing a component, an input of the geographical coordinates of the component on the map is done.

a) First a model of the facility, including position coordinates for major parts of the facility, is created.
b) The model is stored in a location system storage means.
c) The user walks to one component that is present in the geographical area that is represented in the model and identifies the component.
d) The user places a mobile information processing device adjacent the component and detects the position coordinates for the mobile information processing device.
e) The identification information of the component and position coordinates of the mobile information processing device is stored into the location system storage means. The user stores the information or the information is stored automatically.
f) Then the user repeats steps c, d and e for each component that is to be recorded in the location system.

Figure 4:
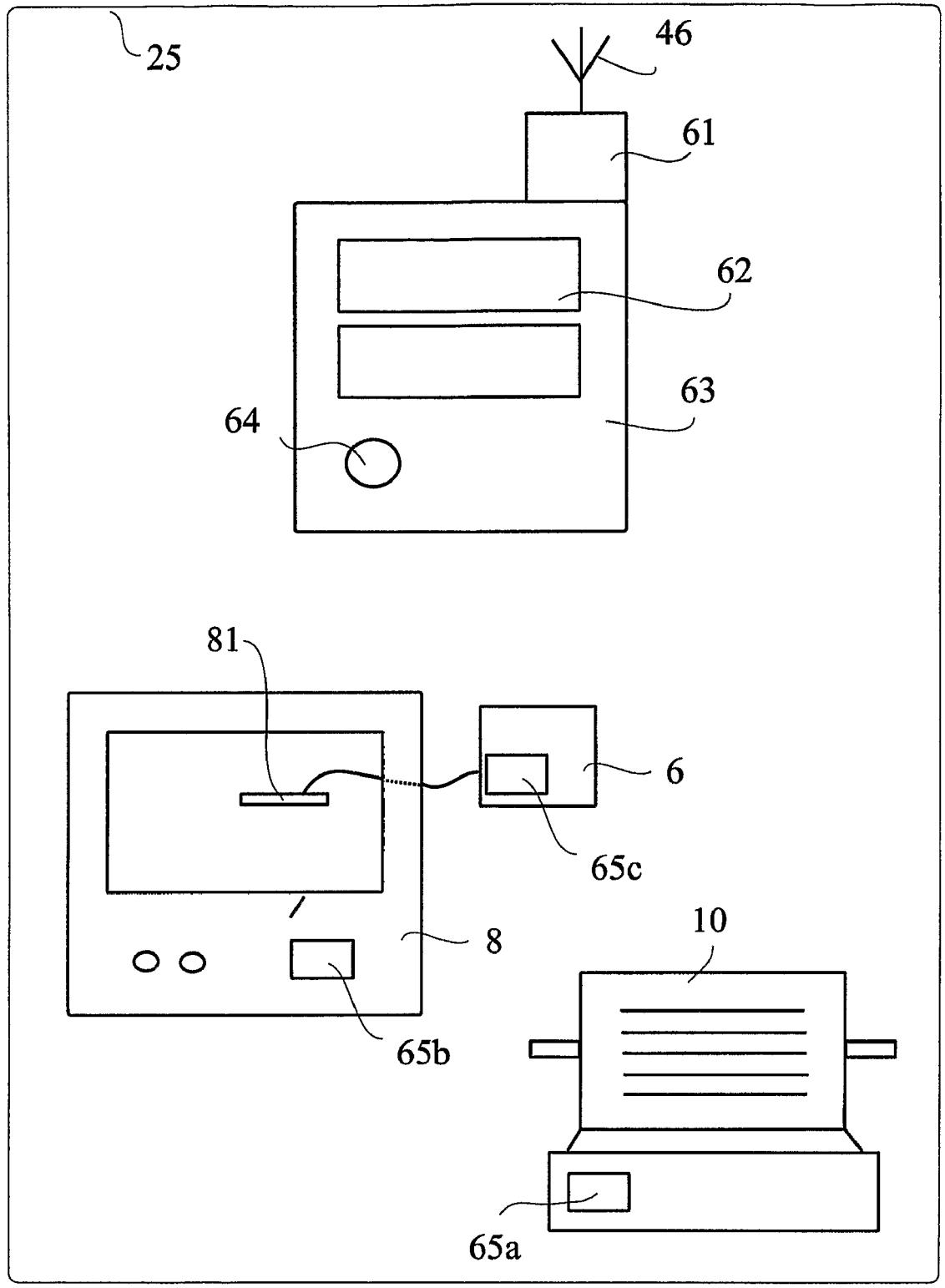
FIG. 4 shows schematically a simplified physical layout for a technical system with identification means attached to the components and a hand-held mobile information processing device, according to the invention.

FIG. 4 shows schematically a simplified layout for a physical implementation of the invention comprising a production area as location area 25, a component that is a motor 10 with identification 65a means, a load 8 as an arc furnace comprising a temperature sensor 81 and identification 65b means, a valve 6 comprising identification 65c means, and a hand-held mobile device 63. A user populates the location system, for instance, by walking through the production area 25. The hand-held mobile information processing device is a recording medium in this case. The mobile device 63 is arranged with wireless communication means 61. The mobile device has access to the control system.

A drawing of the interior of the building comprising the production area 25 is used to create a model of the production area 25, including position coordinates and sub-areas, for major parts such as location of cells in the production or voluminous equipment of the production area (a). The model is stored in a location system storage means (b).

The motor 10 is added to the functional system and is then automatically added to the control system. When the actual physical installation of the motor is made, the motor comprises an identification means 65a. When the user arrives at the motor 10 that has not yet a graphical representation in the location system (c), the user finds the corresponding object in the control system. The user places a mobile information processing device adjacent the motor (d). The mobile information processing device reads the identification means on the motor and the motor is recognized in the control system. The user records the physical coordinates in place on the recording medium 63 (e). The wireless mobile information processing device physically locates the motor, and the coordinates are recorded. Then the motor is established at the correct location in the location system.

The valve 6, is also replaced. The arc furnace comprises identification means 65c. When the user arrives at the valve that already has a graphical representation and physical coordinates in the location system, the user finds the corresponding object in the control system (c). The user places the recording medium device adjacent the valve. The user records the physical coordinates in place on the recording medium 63 as described above (d). The mobile information processing device reads the identification means 65c on the valve and the motor is recognized in the control system. The wireless mobile information processing device physically locates the valve, and the new coordinates are recorded (e). Then the valve is established at the correct location in the location system. Then the valve also is established at the correct location in the location system.

Components such as components that have moved or areas that need reconfiguration are simply updated by repeating the steps for each of the components.

The hand-held mobile information processing device is for instance an Internet-enabled mobile personal digital assistant (PDA) with access to the control system via wireless connectivity. The mobile information processing device comprises a user interface to carry out the input of physical coordinates in the location system of the location areas and borders and components of the facility.

The hand-held mobile information processing device is for instance in another embodiment of the invention an industrial robot instruction input device with access to the control system via a cable between the mobile information processing device and the component.

This recording of the device can be done in a number of ways:

The mobile information processing device comprises a button 64 for the user to push for entering the current position of the device.
The mobile information processing device comprises text boxes 62 to enter the positions manually.
The mobile information processing device comprises means to enter the positions by voice control.
The mobile information processing device comprises soft screen means to enter the positions.

To find the correct object in the control system can be done in a number of ways:

By navigating through the control system and finding the correct component.
By reading an individual identification means attached to the component, such as a tag, e.g. bar code, radio frequency tag (RF-tag) or a wireless technology link, such as Bluetooth.
Image recognition of a component or a graphical tag on the component.

To create a model of the facility, including position coordinates for major parts of the facility, in the control system can be done in a number of ways:

By Computer Aided Design (CAD) drawings.
To get an exact copy of a facility a method with laser scanning can be used. Each laser scanning is made from a predefined position in the facility, resulting in a view of the facility. Each laser scanning view comprises at least one position taken from a set of reference positions. The resulting views made from the predefined positions can be combined to a complete three-dimensional model of the facility.

The component is, for instance, positioned by choosing a position representation of the component in the location system. The user holds the mobile information processing device adjacent to the component. Location technology such as, for instance, a positioning system is used to identify the position of the mobile information processing device, for instance an indoor global positioning system (GPS) or wireless access points. The user then enters the coordinates of the mobile information processing device as corresponding to those of the component found at that location. The component is then automatically placed in the location system. The mobile information processing device position is preferably known in real-time.

Figure 5:
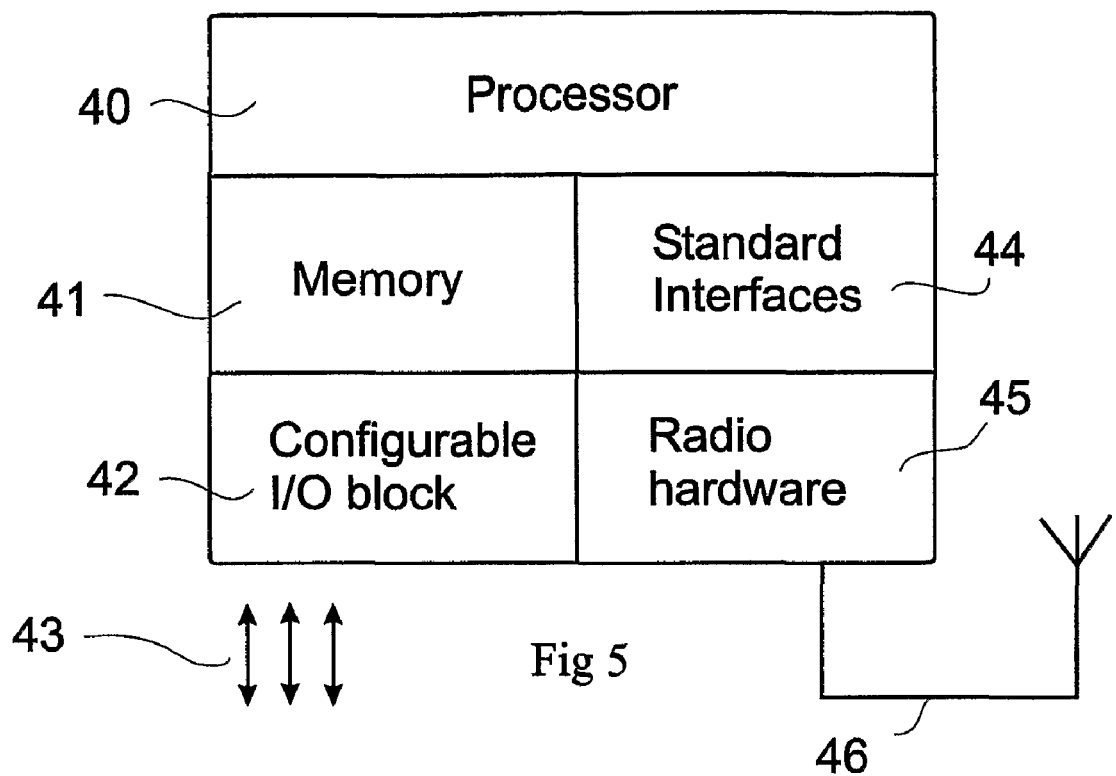
FIG. 5 shows a schematic block diagram of a hardware configuration for a mobile information processing device, according to the invention.

FIG. 5 shows a schematic block diagram of a hardware configuration for a wireless device for locating a component in a technical system.

The device comprises a radio antenna 46, radio receiver/transmitter hardware 45, a processor 40, memory means 41, standard interface 44, and a configurable hardware I/O interface (input/output interface) 42. The standard interfaces 44 comprise, for instance, any data interface to a processor, such as a serial interface. The configurable hardware I/O interfaces accept input signal into the mobile information processing device and/or send an output signal out from the mobile information processing device, as indicated by arrows 43 in the figure.

Figure 6:
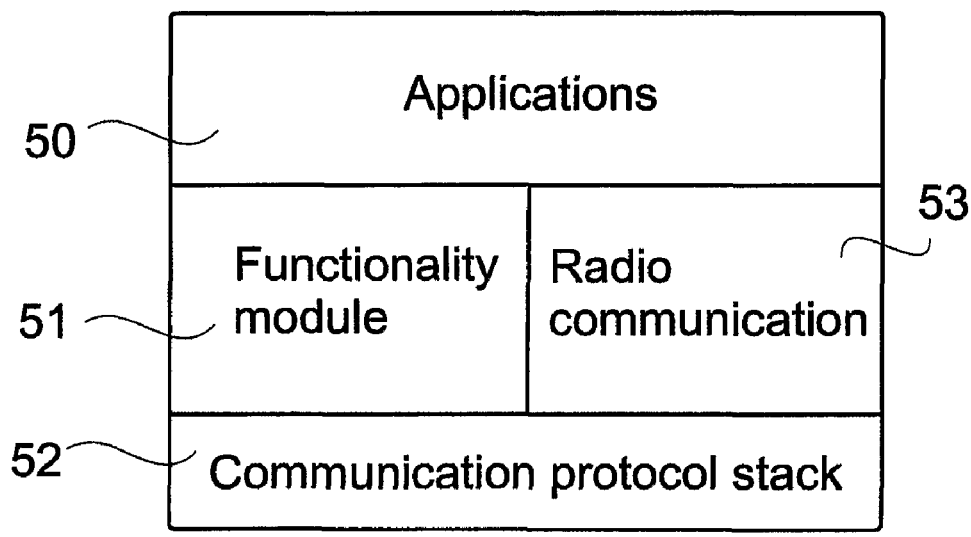
FIG. 6 shows schematically a software configuration for a mobile information processing, according to the invention.

FIG. 6 shows schematically a software configuration for the wireless controller comprising software means including application programs 50 comprising a configurable control-loop, a functionality module 51, and radio communication functions 53, such as a communication protocol stack 52.

In respect of FIGS. 5 and 6 the wireless controller comprises six main building blocks (comprised as hardware and software), namely:
    Processor (or micro-controller) and memory
    Radio transmitter/receiver
    Communication protocol stacks
    Control functions applications program
    Functionality module
    Configurable interface for configuration of different I/O interfaces These blocks form a complete system that can run both autonomously and/or is connected to a higher level control system for a technical system for instance a production cell or other production processes in a facility. The system is capable of interconnection with a very large variety of other components/systems due to the configuration of each channel of the hardware interface as either input or output, which may be digital or analogue and for compatibility with various bus and/or fieldbus standards.

The wireless mobile information processing device may be comprised as a substantially single circuit. In practice, this may be produced, for example, as an integrated circuit with all the components on one board, or an encapsulated circuit containing all described blocks, and hence implementing the full functionality of the described invention. The encapsulation may comprise several interconnected silicon-based components, such as a radio, programmable hardware, a Central Processing Unit (CPU), and a memory.

The processed data may be stored in the memory 41 for later retrieval. The operational data is displayed on the display 62 on the mobile information processing device 63, communicated preferably by wireless means.

The operation on the wireless mobile information processing device is basically as follows for a device arranged in conjunction to operate in a technical system/industrial process:
    data is collected from an output means on the component
    the wireless device reads a wireless signal 43, such as an RF-tag, via wireless connection means to the system
    the wireless signal 43 is received via the antenna 46, processed in the radio hardware 45, passed to the communication protocol stacks 52, running in the processor 40 to an application program 50 as appropriate, and
    the signal is processed by the application program which generates location representation signals and other signals as required and sent via one or more output channels of the configurable hardware I/O interface 42,
    the wireless device sends a wireless signal via wireless connection means to the system
    the output signal 43 from the wireless mobile information processing device is received via a wire or data bus at an input node on a supervisory apparatus control unit for input to the system.

Figure 7:
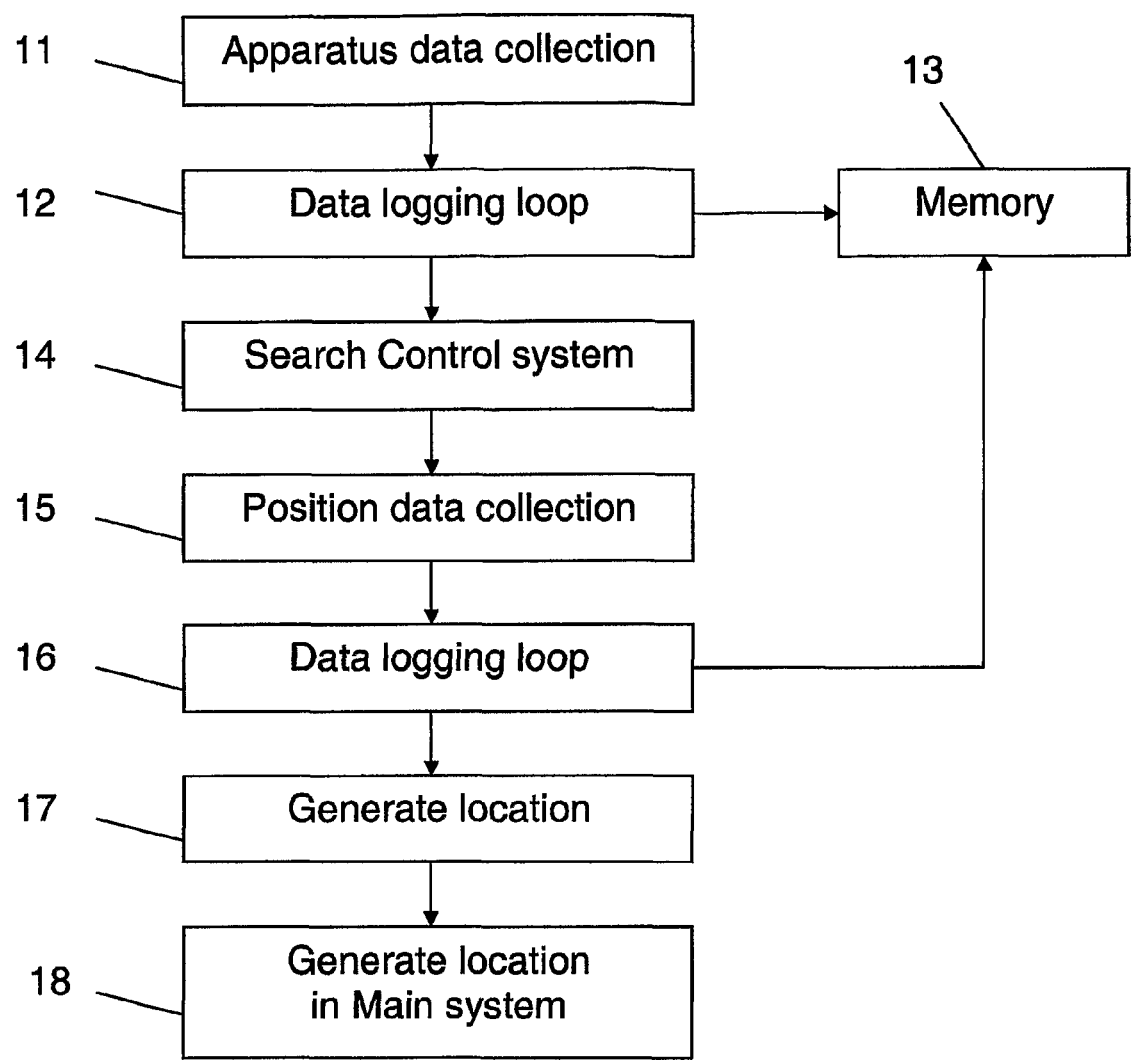
FIG. 7 shows a flowchart for a method for providing location information according to the invention.

FIG. 7 shows a flowchart for a method for providing location information by means of a wireless mobile information processing device based on operational data handled by the wireless mobile information processing device. The wireless mobile information processing device collects component data (11). The Component data is processed, and made available for display and use (12). The processed operational data, or part of it, may also be stored in memory (13). The control system is searched for the component (14). Position data is collected (15). The position data is processed, and made available for display and use (16). The processed operational data, or part of it, may also be stored in memory (13). The location data of the component is generated (17). The location data is transmitted to the main system (18), the location system.

Wireless communications may be carried out using a wireless protocol capable of providing reliable transmissions in an industrial environment including standards or any suitable protocol such as Ericsson's Bluetooth, Wireless Local Area Network (WLAN). Short range radio communication is the preferred technology, using a protocol compatible with, standards issued by the Bluetooth Special Interest Group (SIG), any variation of IEEE-802.11, WiFi, Ultra Wide Band (UWB), ZigBee or IEEE-802.15.4, IEEE-802.13 or equivalent or similar. More generally a radio technology working in the ISM band with significant interference suppression means by spread spectrum technology is preferred. For example a broad spectrum wireless protocol in which each or any data packet may be re-sent at other frequencies of a broad spectrum 7 times per millisecond, for example, may be used, such as in a protocol from ABB called Wireless interface for sensors and actuators (Wisa). Wireless communication may also be carried out using Infra Red (IR) means and protocols such as IrDA, IrCOMM or similar. Wireless communication may also be carried out using sound or ultrasound transducers, through the air or via work object construction, pure magnetic or electric fields (capacitive or inductive communication) or other types of light, such as for example LED, laser, as communication media with standard or proprietary protocols. For the communication, there may be further requirements imposed by the fieldbus or other parts of the control system. For example, there may be a requirement in respect of defining maximum permissible latency, e.g. the time from an I/O changes on e.g. a bus means such as Profibus till the actual I/O value changes on the component exterior. The wireless mobile information processing device provides the information preferably adapted for a thin client application, such as a web client or other web browser type of application.

In a physical implementation of the invention for instance the operator uses: a mobile hardware Personal Digital Assistant (PDA), a tablet personal computer PC, a wearable computer, a mobile phone or any other piece of equipment that can present the necessary information, a positioning system such as indoor or outdoor GPS, positioning by WLAN or other standards or protocols, wireless access to information, for instance via General Packet Radio Service (GPRS), WLAN, Bluetooth or other.

The microprocessor, or processors, of the wireless mobile information processing device comprises a central processing unit CPU performing the steps of the method according to an aspect of the invention. This is performed with the aid of one or more computer programs, which are stored at least in part in memory accessible by the processor. It is to be understood that the computer programs may also be run on one or more general-purpose industrial microprocessors or computers instead of a specially adapted computer.

The computer program comprises computer program code elements or software code portions that make the computer perform the method using equations, algorithms, data and calculations previously described. A part of the program may be stored in a processor as above, but also in ROM, RAM, PROM or EPROM chip or similar memory means, the program in part or in whole may also be stored on or in, another suitable computer-readable medium such as a magnetic disk, CD-ROM or DVD disk, hard disk, magneto-optical memory storage means, in a volatile memory, in a flash memory, as firmware, or stored on a data server.

The computer programs described may also be arranged in part as a distributed application capable of running on several different computers or computer systems at more or less the same time.

The invention claimed is:

1. A method configured to record a position of at least one component in a location system of a control system of an industrial facility configured to carry out an industrial process, the method comprising:
   a) creating a model of the facility, including position coordinates for major parts of the facility,
   b) storing the model in a location system storage system,
   c) identifying a component in the facility,
   d) placing a mobile information processing device adjacent the component and detecting position coordinates for the mobile information processing device,
   e) determining a location of the component in the model of the facility based on the detected position coordinates for the mobile information processing device, and
   f) storing identification information of the component and position coordinates of the mobile information processing device in the location system storage system.

2. The method according to claim 1, further comprising: repeating steps c, d, e and f for each component that is to be recorded in the location system.

3. The method according to claim 1, further comprising: using a positioning system to detect the position coordinates of each position in a geographical area of the model.

4. The method according to claim 1, further comprising: using one or more nodes of wireless communication members to detect the position coordinates of each position in the model of the geographical area.

5. The method according to claim 1, further comprising: using a wireless local area network to detect the position coordinates of each position in the model of the geographical area.

6. The method according to claim 1, further comprising: using button or other input members to store the identification information of the component and position coordinates of the mobile information processing device in the location system.

7. The method according to claim 1, further comprising: using a data display to store the identification information of the component and position coordinates of the mobile information processing device in the location system.

8. The method according to claim 1, further comprising: using wireless communication members to store the identification information of the component and position coordinates of the mobile information processing device in the location system.

9. The method according to claim 1, further comprising: using a positioning system to detect the position coordinates of the location of the mobile information processing device.

10. The method according to claim 1, further comprising: using wireless system to detect the position coordinates of the location of the mobile information processing device.

11. The method according to claim 1, wherein a component comprises individual identification members attached to the component, the method further comprising:
   identifying the component in the control system by the individual identification elements on the component.

12. The method according to claim 1, wherein the control system comprises an image recognition element of the component, the method further comprising:
   identifying the component in the control system by the image recognition member.

13. The method according to claim 1, further comprising: creating means to create position coordinates for a component in the location system when implementing the component in the control system.

14. The method according to claim 1, further comprising: identifying a component in the location system by navigating through a corresponding control system.

15. The method according to claim 1, further comprising: separating the model of the facility in sub-areas, wherein each component located in that sub-area also has a sub-area position coordinate in the location system.

16. The method according to claim 1, further comprising: locating a component in a physical implementation by the location coordinates of the component in the location system.

17. The method according to claim 1, wherein clicking on a component or a sub-area in the location system selects that component or sub-area.

18. The method according to claim 1, wherein the graphical representation of the location system is a data display picture.

19. The method according to claim 1, wherein the mobile information processing device communicates with the control system through a cable between the device and the component, or the control system.

20. The method according to claim 18, wherein the data display picture comprises at least one of a spread sheet, a drawing or a diagram.

21. A computer program product, comprising:
   a non-transitory computer readable medium; and
   programming instructions recorded on the computer readable medium to control a computer or a computer process to make it perform a method including
   creating a model of the facility, including position coordinates for major parts of the facility, storing the model in a location system storage system,
identifying a component in the facility,
placing a mobile information processing device adjacent the component and detecting position coordinates for the mobile information processing device,
determining a location of the component in the model of the facility based on the detected position coordinates for the mobile information processing device, and
storing identification information of the component and position coordinates of the mobile information processing device in the location system storage system.

22. A control system of an industrial facility configured to carry out an industrial process system, the control system being configured to record the position of at least one component in a location system of the control system, the control system comprising:
 a mobile information processing device configured to identify the at least one component,
 a computer program configured to create a model of the facility and store the model in a location system,
 graphical user interface configured to display the configuration of the industrial facility based on the recorded position of the at least one component,
 a positioning system configured to determine a position of the mobile information processing device,
 a location system configured to locate the at least one component based on the determined position of the mobile information processing device, and
 a computer configured to store identification information of the component and position coordinates of the mobile information processing device in the location system storage system.

23. The control system according to claim 22, further comprising:
 wireless access to information.

24. The control system according to claim 23, further comprising:
 a mobile information processing device for recording the position of at least one component in a location system of a control system of an industrial facility for an industrial process, comprising:
 a processor,
 a memory module,
 standard interface, and
 an input member.

25. The control system according to claim 24, wherein the mobile information processing device further comprises:
 a radio antenna,
 radio receiver/transmitter hardware, and
 wireless means.

26. The control system according to claim 24, wherein the mobile information processing device further comprises:
 a wireless hardware member.

27. The control system according to claim 24, wherein the mobile information processing device is compatible with the ISM band with significant interference suppression means by spread spectrum technology.

28. The control system according to claim 24, wherein the mobile information processing device is compatible with a protocol wherein each data packet may be re-sent one or more times per second at different frequencies in the spectrum.

29. The control system according to claim 24, wherein the mobile information processing device further comprises:
 a configurable hardware input/output interface.

30. The control system according to claim 22, further comprising:
 a database comprising information to be used in a method in an industrial system for recording the position of at least one component in a location system of the control system.

31. The control system according to claim 22, further comprising:
 a website comprising means to perform a method in an industrial system for recording the position of at least one component in a location system of the control system.

32. The control system according to claim 22, wherein the positioning system comprises a global positioning system.

33. The method according to claim 22, wherein the mobile information processing device comprises a mobile hardware Personal Digital Assistant.

34. The control system according to claim 22, wherein the positioning system comprises indoor or outdoor GPS, positioning by WLAN or other standards or protocols, or GSM.

35. The control system according to claim 22, wherein the computer comprises a tablet personal computer.

36. The control system according to claim 23, wherein the wireless access to information comprises General Packet Radio Service, VLAN, or Bluetooth.

37. The system according to claim 22, further comprising:
 a component with an individual identification attached to the component.

38. The system according to claim 37, wherein the individual identification comprises a tag.

39. The system according to claim 38, wherein the tag comprises a bar code, a radio frequency tag or a wireless technology link.

40. The system according to claim 22, further comprising:
 a graphical user interface for recording the position of at least one component in a location system of a control system of an industrial facility for an industrial process, the graphical user interface comprising
 a display element configured to display said at least one component,
 a display element configured to display position coordinates for said component, and
 an input member configured to register position coordinates of said component.

41. The system according to claim 40, wherein the graphical user interface further comprises:
 an input element configured to register identification information of the component; and
 an input element configured to register position coordinates of the mobile information.

42. The system according to claim 40, wherein the graphical user interface, further comprises:
 a display element configured to identify a component.

43. The system according to claim 40, wherein the graphical user interface further comprises:
 an input member configured to register the position coordinates for the mobile information processing device.

44. The system according to claim 40, wherein the graphical user interface further comprises:
 a display element configured to create a model of the facility, including position coordinates for major parts of the facility such as sub-areas, and
 an input member configured to register position coordinates of the model.

* * * * *